(12) United States Patent
Kumar et al.

(10) Patent No.: US 6,880,238 B1
(45) Date of Patent: Apr. 19, 2005

(54) ELECTROCHEMICAL USES OF AMORPHOUS FLUOROPOLYMERS

(75) Inventors: Sridhar Kumar, Hockessin, DE (US); Govindarajulu Rajendran, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/959,078

(22) PCT Filed: Apr. 20, 2000

(86) PCT No.: PCT/US00/10641

§ 371 (c)(1),
(2), (4) Date: Oct. 17, 2001

(87) PCT Pub. No.: WO00/67336

PCT Pub. Date: Nov. 9, 2000

Related U.S. Application Data

(60) Provisional application No. 60/131,799, filed on Apr. 30, 1999.

(51) Int. Cl.$^7$ .................................................. B23P 19/04
(52) U.S. Cl. .......................... 29/730; 29/729; 29/623.3; 29/623.4; 29/623.5; 427/77; 427/115; 429/30; 429/33; 429/41
(58) Field of Search ............................. 29/623.3, 623.4, 29/623.5, 729, 730; 427/77, 115; 429/30, 33, 41

(56) References Cited

U.S. PATENT DOCUMENTS

| | | | | |
|---|---|---|---|---|
| 4,536,272 A | | 8/1985 | Blanchart et al. | |
| 4,818,643 A | | 4/1989 | Cook et al. | |
| 5,395,705 A | * | 3/1995 | Door et al. | 429/42 |
| 5,863,610 A | | 1/1999 | Young et al. | |
| 6,054,230 A | * | 4/2000 | Kato | 429/33 |
| 6,156,451 A | * | 12/2000 | Banerjee et al. | 156/228 |
| 6,277,513 B1 | * | 8/2001 | Swathirajan et al. | 429/44 |
| 6,521,381 B1 | * | 2/2003 | Vyas et al. | 429/232 |

* cited by examiner

Primary Examiner—Bruce F. Bell

(57) ABSTRACT

An electrochemical application that utilizes amorphous fluoropolymers providing a membrane electrode assembly that is durable, uniform and possesses a good structural integrity, produced by a method that avoids a long, complicated sintering of the fluoropolymers incorporated at undesirably high temperatures.

15 Claims, 6 Drawing Sheets

ELECTROCHEMICAL USES OF AMORPHOUS FLUOROPOLYMERS

This application claims the benefit of Provisional application No. 60/131,799, filed Apr. 30, 1999.

FIELD OF THE INVENTION

This invention is directed to the use of amorphous fluoropolymers in electrochemical applications, particularly in fuel cells.

BACKGROUND

Hydrogen and methanol fuel cells are of considerable importance in the search for new energy technologies, see for example, Ullmann's Encyclopedia of Industrial Chemistry, 5th ed. Vol 12A, pp. 55ff, VCH, New York, 1989. One approach in the development of these fuel cells is to employ solid polymer electrolyte membranes in combination with a catalyst layer and a gas diffusion backing (GDB) layer to form a membrane electrode assembly (MEA). The catalyst layer typically includes a finely divided metal such as platinum, palladium, or ruthenium, or a combination of more than one metal such as platinum-ruthenium, or a metal oxide, such as ruthenium oxide, usually in combination with a binder. In hydrogen fuel cells, the catalyst is normally supported on carbon; in methanol fuel cells, the catalyst is normally unsupported. The gas diffusion backing is typically a highly porous carbon sheet or fabric. See Yeager et al, U.S. Pat. No. 4,975,172 for an example of such cells.

A common problem of hydrogen and direct methanol fuel cells is susceptibility to flooding by excessive water which introduces mass transport limitations in the reactant and/or product streams, and thereby disrupts the performance of the fuel cell. It has become common practice to incorporate fluoropolymers in the catalyst layer and gas diffusion backing to impart a degree of hydrophobicity to otherwise hydrophilic structures, an example being the use of polytetrafluoroethylene (PTFE) or copolymers thereof with hexafluoropropylene or a perfluorovinyl ether. (See Blanchart, U.S. Pat. No. 4,447,505, Yeager, op.cit., and Serpico et al, U.S. Pat. No. 5,677,074.)

In order to achieve durability, uniformity, and structural integrity, it is usually necessary to sinter the fluoropolymers so employed. The fluoropolymers of the art exhibit crystalline melting points well above 200° C., making it is necessary to perform the sintering at temperatures above 300° C. The heating cycle associated therewith is long and complicated. Furthermore, the high temperature tends to degrade other components of the MEA requiring in practice that the sintering take place before the MEA is assembled. A representative sintering cycle is illustrated schematically in FIG. 1.

The following disclosures may be relevant to various aspects of the present invention and may be briefly summarized as follows:

Serpico, op.cit., discloses a porous gas diffusion electrode having a catalyst layer containing optimally 15–30% PTFE in a catalyst layer. The resulting catalyst layer is heated to 380° C. in an inert atmosphere prior to combination with the SPE membrane.

MacLeod, U.S. Pat. No. 4,215,183 discloses an electrochemical cell such as a fuel cell comprising an ion exchange membrane electrolyte and catalytic electrodes bonded to the surface of the membrane provided with a wet proofed carbon paper current collector at the oxidizing electrode. The wet-proofed conductor containing 20–35 mg/cm$^2$ of PTFE, is sintered at a temperature of 590–650° F. Further disclosed is a catalyst composition wherein 15–30 wt-% of PTFE particles are intermixed with catalyst particles, which is similarly sintered prior to forming the MEA.

Wilson, U.S. Pat. No. 5,234,777, discloses a gas reaction fuel cell incorporating a thin catalyst layer between a solid polymer electrolyte (SPE) membrane and a porous electrode backing. The catalyst layer is preferably less than about 10 μm in thickness with a carbon supported platinum catalyst loading less than about 0.35 mgPt/cm$^2$. The film is formed as an ink that is spread and cured on a film release blank. The cured film is then transferred to the SPE membrane and hot pressed into the surface to form a catalyst layer having a controlled thickness and catalyst distribution. Alternatively, the catalyst layer is formed by applying a Na$^+$form of a perfluorosulfonate ionomer directly to the membrane, drying the film at a high temperature, and then converting the film back to the protonated form of the ionomer. The layer has adequate gas permeability so that cell performance is not affected and has a density and particle distribution effective to optimize proton access to the catalyst and electronic continuity for electron flow from the half-cell reaction occurring at the catalyst Fujita et al, Japanese Patent 02007399, discloses a method similar to that of Wilson, op.cit. except PTFE is included in the catalyst composition and the deposition of the catalyst layer to the SPE membrane is effected at 100° C. Under such conditions, the PTFE remains as discrete powder particles within the composition, and is highly susceptible to being flushed out, or simply falling out during use.

Yeager et al, U.S. Pat. No. 4,975,172, discloses gas diffusion electrodes and gas generating or consuming electrochemical cells. The electrode includes an electronically conductive and electrochemically active porous body defining respective gas and electrolyte contacting surfaces, with an ionomeric ionically conductive gas impermeable layer covering the electrolyte contacting surface. The layer includes a layer of a hydrophilic ionic polymer applied directly to the electrolyte contacting surface and a membrane of a hydrophilic ion exchange resin overlying the polymer layer.

The present invention provides for an MEA that is durable, uniform, and possesses good structural integrity, produced by a process which does not require a long, complicated sintering of the fluoropolymers incorporated therein at undesirably high temperatures.

SUMMARY OF THE INVENTION

Briefly stated, and in accordance with one aspect of the present invention, there is provided a method for forming a membrane electrode assembly, the method comprising: forming a layered structure including at least one substantially fluorinated solid polymer electrolyte membrane, at least one catalyst layer containing a noble metal catalyst and a substantially fluorinated ionomeric resin binder, and at least one fibrous carbon gas diffusion backing layer, having at least one of the catalyst layer or at least one of the fibrous carbon gas diffusion backing layer further comprising an amorphous fluorocarbon polymer, heating the layered structure to a temperature of less than about 200° C.; and applying pressure to the heated layered structure to produce a consolidated membrane electrode assembly wherein the catalyst layer is in ionically conductive contact with the solid polymer electrolyte membrane, and the gas diffusion backing layer is in electronically conductive contact with the catalyst layer.

Pursuant to another aspect of the present invention, there is provided a method for forming a catalyst coated membrane comprising: combining a substantially fluorinated non-ionic polymeric ionomer-precursor resin and a noble metal catalyst to form a homogeneous mixture; applying the mixture to the surface of a solid polymer electrolyte membrane to form a coated membrane; contacting the coated membrane with an alkali metal base to hydrolyze the non-ionic polymeric ionomer-precursor resin forming an ionomer therefrom; and contacting the ionomer with a mineral acid.

Pursuant to another aspect of the present invention, there is provided a membrane electrode assembly comprising: a substantially flourinated solid polymer electrolyte membrane separator, a catalyst layer in ionic conductive contact with the separator wherein the catalyst layer comprises a catalyst and a substantially fluorinated ionomeric resin binder, a fibrous carbon gas diffusion backing layer in electronic conductive contact with the catalyst layer, and a fluoropolymer included in one or both of the catalyst layer and the backing layer, the fluoropolymer consisting essentially of amorphous fluoropolymers.

BRIEF DESCRIPTION OF THE FIGURES

Other features of the present invention will become apparent as the following description proceeds and upon reference to the Figures, in which.

DETAILED DESCRIPTION

Figure 2:
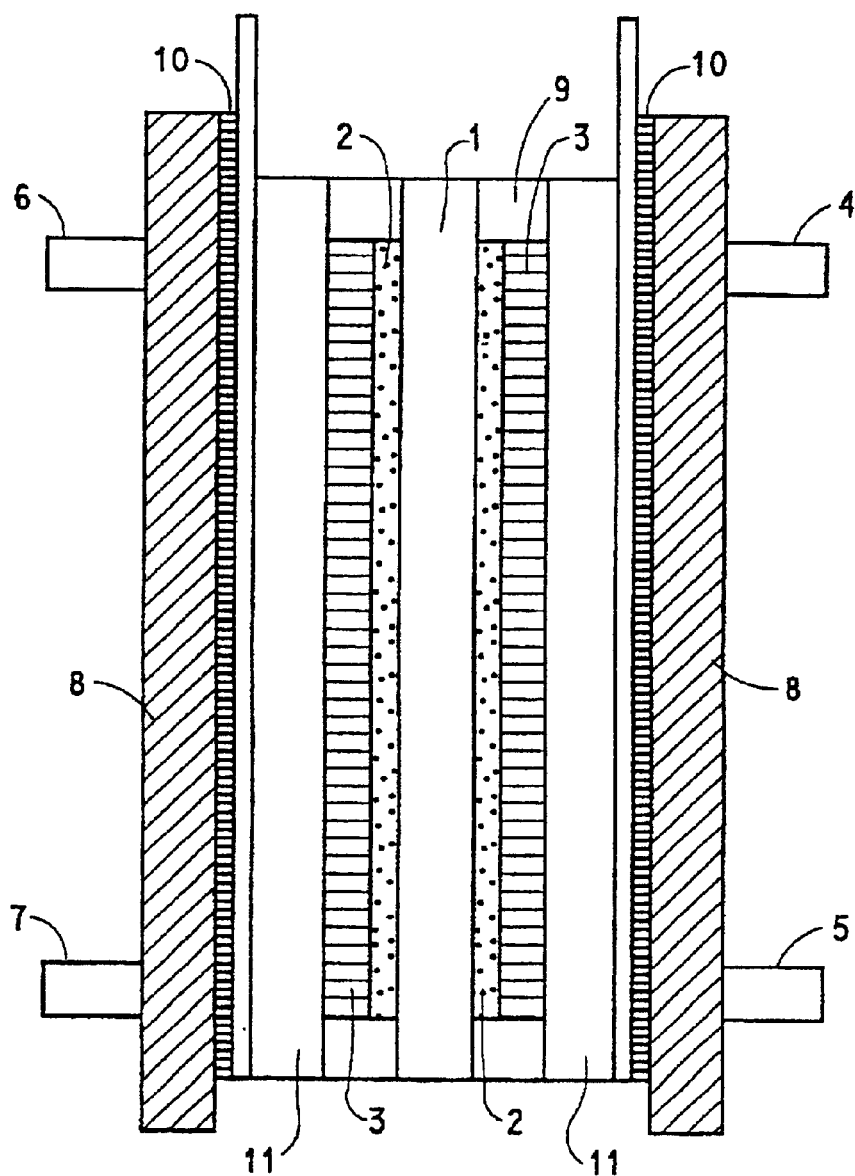
FIG. 2 is a schematic illustration of the single cell test assembly employed in evaluating the performance of the membrane electrode assemblies.

The low solubility and high processing temperatures which characterize the fluoropolymers of the art create considerable incentive to find a functionally equivalent substitute without the disadvantages. The disadvantages of the fluoropolymers of the art are thought largely to be related to the high crystallinity thereof. In the present invention, the highly crystalline fluoropolymers of the art are replaced by noncrystalline fluoropolymers. The non-crystalline fluoropolymers suitable for use in the present invention are substantially fluorinated polymers, preferably perfluorinated polymers, characterized in that they do not exhibit an endotherm greater than 1J/g as determined by Differential Scanning Calorimetry, ASTM D4591. For the purposes of the present invention, "substantially fluorinated" refers to the replacement of at least about 90% of the hydrogens in the associated non-fluorinated polymer by fluorines. Preferred fluoropolymers are copolymers of tetrafluoroethylene (TFE) with comonomers from the group of hexafluoropropylene (HFP), perfluoroalkyl vinyl ethers, 2,2-bistrifluoromethyl4,5-difluoro-1,3-dioxole (PDD), and mixtures thereof. Preferably, the concentration of TFE monomer units is 80 mol-% or less and the concentration of the comonomer is at least 20 mol-%. Most preferred are a terpolymer comprising 60 mol-% TFE, 26 mol-% perfluoromethyl vinyl ether, and 14 mol-% perfluoroethylvinyl ether, and a copolymer of TFE and PDD comprising 67 mol-% PDD.

The copolymers of TFE with HFP or perfluoro alkyl vinyl ethers preferred for the practice of the invention, and methods for their synthesis, are described in Anolick et al U.S. Pat. No. 5,663,255, while those of TFE and PDD are described in Squire, U.S. Pat. No. 4,754,009, both of which are incorporated herein in their entirety by reference.

The non-crystalline fluoropolymers of the present invention are soluble in a variety of perfluorinated solvents, and coalesce at temperatures of less than 200° C., preferably less than 160° C. Solvents suitable for the practice of the invention include perfluorooctane and derivatives thereof, perfluorodecalins and derivatives, perfluorobenzene, perfluoromethylcyclohexane, perfluorodimethylcyclohexane, perfluoro(n-butyl tetrahydrofuran), $(C_4F_9)_3N$, $(C_4F_9)_2S$, $(C_2F_5)_2SO_2$, $C_8F_{17}SO_2F$. Preferred solvents include perfluoro(n-butyl tetrahydrofuran), $(C_4F_9)_3N$, and perfluorooctane.

Alternatively, aqueous dispersions of the fluoropolymers suitable for the, practice of the invention may be made and employed to form the compositions of the invention, but they are less effective at wetting the preferred carbon substrates and thus, are less preferred.

In a preferred embodiment of the present invention, a copolymer of 1TFE and PDD, most preferably having a concentration of PDD of 67 mol-%, (available as Teflon® AF 1600 from the DuPont Company, Wilmington, Del.), in the form of the as-polymerized polymer powder, is dissolved in perfluorooctane, (available as PF5080 from the 3M Company, Minneapolis, Minn.), at or above room temperature to form an amorphous fluoropolymer solution of 1–30% solids by weight. An amorphous fluoropolymer solution of 5 to 10% solids by weight is preferable.

In one embodiment of the invention particularly suitable for use in hydrogen fuel cells, a catalyst composition is formed. A metal, metal alloy and/or metal oxide catalyst selected according to the teachings of the art, preferably platinum (Pt), is combined with carbon particles to form a supported catalyst. The concentration of the catalyst is about 5–60% by weight, preferably 20%–40%, on the weight of the carbon. The carbon is preferably a medium to high surface area powder (about 100 to about 2000 $m^2/g$). Vulcan® XC72 carbon black available from Cabot Corp., Billerica, Mass. has been found to be highly suitable.

The thus-formed supported catalyst is slurried with a 5–10% solids by weight dispersion of a substantially fluorinated, preferably perfluorinated ionomer in water, alcohol, or, preferably a water/alcohol mixture (commercially available from DuPont Company as SE-5112) to form a catalyst dispersion. Preferred ionomers are perfluorinated copolymers of PTFE and a monomer having pendant groups described by the formula

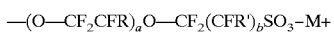

where R and R' are independently selected from F, Cl or a perfluorinated alkyl group having 1 to 10 carbon atoms, a=0, 1 or 2, b=0 to 6, and M is H or a univalent metal. Preferably, R is trifluoromethyl, R' is F, a=0 or 1, b=1, and M is H or an alkali metal. Most preferably, a=1 and M is H. When M is not H, an additional ion exchange step must be introduced at some convenient stage in the process herein outlined to convert M to H. Contacting the ionomer with a mineral acid in any convenient manner will suffice. Suitable ionomers have equivalent weights in the range of 700–2000EW.

The resulting catalyst dispersion is then slurried with the amorphous fluoropolymer solution (so as to result in about 1–20 wt % of the amorphous fluoropolymer in the final dry composition) as hereinabove described to form a uniform catalyst paste or ink. Any additional additives such as are commonly employed in the art may also be incorporated into the slurry.

The resulting catalyst paste or ink may then be coated onto an appropriate substrate for incorporation into an MEA. The method by which the coating is applied is not critical to the practice of the present invention. Numerous methods are practiced in the art.

Figure 1:
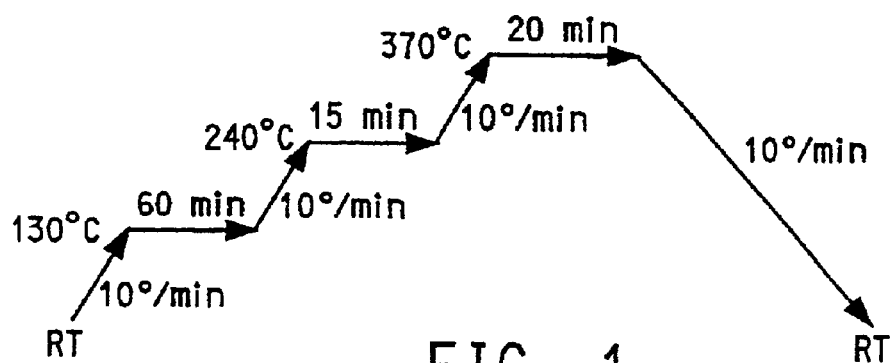
FIG. 1 represents, schematically, a typical sintering cycle employed for consolidation of a PTFE-coated GDB of the art.

One method is to first combine the catalyst ink of the invention with a GDB, preferably but not necessarily the GDB of the invention, and then, in a subsequent step, with the SPE membrane. The thermal consolidation step of he sintering process required for PTFE, shown in FIG. 1, is now omitted since the high temperature consolidation of the fluoropolymer is no longer required. Instead, the consolidation is performed simultaneously with consolidation of the MEA at a temperature no greater than 200° C., preferably in the range of 140–160° C.

In a preferred embodiment, a CCM of the present invention comprises a thin catalyst layer containing an amorphous fluoropolymer disposed upon a solid polymer electrolyte (SPE) membrane. The catalyst layer is preferably less than about 10 μm in thickness with the carbon supported catalyst loading less than about 0.35 mgPt/cm². In one method of preparation, the catalyst film is prepared as a decal by spreading the catalyst ink on a flat release substrate such as Kapton® polyimide film (available from the DuPont Company). Before the ink dries, the decal is transferred to the surface of the SPE membrane by the application of pressure and optional heat, followed by removal of the release substrate to form a CCM with a catalyst layer having a controlled thickness and catalyst distribution. Alternatively, the catalyst layer containing an amorphous fluoropolymer is applied directly to the membrane, such as by printing, and then the catalyst film is dried at a temperature not greater than 200° C. Preferably, the catalyst ink comprises the alkali metal ionomer form of the resin employed to form the SPE membrane, and is converted to the protonated form of the ionomer after consolidation with the SPE membrane by contacting the catalyst layer with a mineral acid. The CCM, thus formed, is then combined with a GDB, preferably of the invention, to form the MEA of the present invention.

In the process of the present invention, the MEA is formed, by layering the catalyst ink, the SPE membrane, and the GDB, wherein at least one, and preferably both, of the catalyst ink and the GDB comprise an unconsolidated amorphous fluoropolymer, followed by consolidating the entire structure in a single step by heating to a temperature no greater than 200° C., preferably in the range of 140–160° C., and applying pressure. Both sides of the MEA can be formed in the same manner and simultaneously. Also, the composition of the catalyst layer and GDB could be different on the two sides of the MEA.

Preferred solid polymer electrolyte membranes are ionomers comprising perfluorinated copolymers of PTFE and a monomer having pendant groups described by the formula

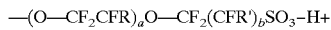
—(O—CF$_2$CFR)$_a$O—CF$_2$(CFR')$_b$SO$_3$-H+ where R and R' are independently selected from F, Cl or a perfluorinated alkyl group having 1 to 10 carbon atoms, a=0, 1 or 2, b=0 to 6. Preferably, R is trifluoromethyl, R' is F, a=0 or 1, b=1,. Most preferably, a=1.

Preferably, and in like manner to the above, a second coating formed in the same way from the same ingredients is applied to the second side of the preferred solid polymer electrolyte membrane.

In another embodiment of the present invention, particularly suitable for use in direct methanol fuel cells, a catalyst composition is formed in the manner hereinabove described however, the carbon catalyst support is omitted. The unsupported catalyst composition so formed may be used instead of the carbon-supported catalyst composition in the above described procedures for forming a CCM and an MEA.

In a preferred embodiment, the gas diffusion backing of the invention is formed by dipping, at room temperature for a period of at least 30 seconds, a porous conductive substrate (preferably a conventional graphite paper or cloth (e.g., TGPH-090 and TGPH-060 available from the Toray Company, Japan) commonly employed in the art), into a <5% solids solution in PF5080 of the most preferred terpolymer of WE, PMVF, and PEVE hereinabove. (One of skill in the art, however, will recognize that gas diffusion backing may be made of numerous other materials including metals and polymers.) Preferably, the paper or cloth is soaked until the concentration of the fluoropolymer in the carbon paper is about 3% by weight, then removed from the solution, and the residual solvent removed by evaporation as hereinabove described. It has been found in the practice of the present invention that the MEA performance is degraded when amounts of the amorphous fluoropolymer of the invention exceed about 5–6% by weight. Other means known in the art may be employed for applying the fluoropolymer of the invention to the gas diffusion backing including spray-coating.

In the practice of the invention, the catalyst layer of the invention is thermally consolidated with a GDB and a SPE membrane at a temperature of under 200° C., preferably 140–160° C., to form an MEA of the invention. The GDB may be made of any type known in the art or, alternatively, in accordance with the present GDB invention. The catalyst layer of the present invention may be deposited onto the surface of the SPE membrane prior to consolidation with the GDB, the method of deposition being any known in the art. Or, the catalyst layer of the invention may first be deposited on the GDB by methods known in the art prior to consolidation with the SPE membrane.

Similarly, the GDB of the invention, is thermally consolidated with a catalyst layer and an SPE membrane at a temperature of under 200° C., preferably 140–160° C., to form an electrode of the invention. The catalyst layer may be that of the invention but need not be. The catalyst layer may be deposited onto the surface of the SPE membrane prior to consolidation with the GDB, the method of deposition being any which is known in the art. Or, the catalyst layer may be first deposited on the GDB of the invention by methods known in the art prior to consolidation with the SPE membrane.

For the present invention, either the catalyst layer of the present invention or the GDB of the present invention disclosed herein are required. Preferably, the catalyst layer and the GDB are both of the invention, with the catalyst layer and SPE membrane being first formed into a CCM as described above.

In the practice of the present invention, the solvent is removed, the amorphous fluoropolymer coagulated, and the MEA is formed in a single step of beating slowly to a temperature between room temperature and 200° C., preferably 140–160° C. The MEAs incorporating a GDB backing of the present invention, having only about 3% by weight of amorphous fluoropolymer, exhibit highly optimized electrochemical performance similar to or better than the MEAs of the known art which require about 10–30% of a semi-crystalline fluoropolymer.

In the present invention, in addition to replacing the semi-crystalline fluoropolymers taught in the art with a relatively new class of amorphous fluoropolymers which exhibit a glass transition temperature only and do not exhibit a crystalline melting point, the amorphous fluoropolymers of the present invention readily form solutions rather than the dispersions of the more highly crystalline polymers of the art. This improves and simplifies the application of the fluoropolymers of the present invention to the catalyst composition and the gas diffusion backing.

Additionally, the present invention combines the improved uniformity and adhesion of a catalyst coated membrane with proper water management via controlled hydrophobicity. Furthermore, in the present invention, optimum performance is achieved at 50–80% lower concentrations of fluoropolymer than taught in the art.

EXAMPLES

The following specific examples are intended to illustrate the practice of the invention and should not be considered to be limiting in any way.

Examples 1–4 and Comparative Examples 1–3 describe the effects of adding an amorphous fluoropolymer to the catalyst layer. In these examples and comparative examples the GDB is prepared according to a method of the art. In Examples 1–4 and comparative Examples 1–3, a catalyst paste was formulated as follows: 15 g of a 20% by weight Pt carbon-supported Pt catalyst (Johnson Mathey, Ward Hill, Mass.), was placed in an ice-cooled glass jar. In a nitrogen atmosphere, 60 g of a 5 wt % Nafion® alcohol/water solution (DuPont, SE5112) and 48 g of 1-methoxy2-propanol (Aldrich Chemical) were added and mixed well using a Tempset Virti Shear stirrer with a setting at 1 for 30–45 mins. After stirring, the whole mixture was transferred into a ball mill (Stoneware Ball Mill, East Palestine, Ohio) and milled for 18 hrs using Burundam cylinders of size ½"×½". The milled mixture was poured through the filter paper to remove the balls and the balls were washed with additional 1-methoxy 2-propanol. The particle size was measured with grind gage #5252 (Precision Cage & Tool Co., Ohio) and found to be 3–4 $\mu$m. The solvent was evaporated slowly at a moderate temperature (50–60C.) with nitrogen bubbling for 30 mins to form a catalyst paste. The catalyst paste so prepared contained no fluoropolymer except the Nafion® binder.

Reference is now made to FIG. 2, which shows schematically a single cell test assembly. Fuel cell test measurements were made employing a single cell test assembly obtained from Fuel Cell Technologies Inc, N.Mex. As shown in FIG. 2, a Nafion® perfluorinated ion exchange membrane, 1, was combined with a catalyst layer, 2, comprising platinum supported on carbon particles, Nafion® binder, and a gas diffusion backing, 3, comprising carbon paper and a fluoropolymer, to form an membrane electrode assembly (MEA). The test assembly was provided with an anode gas inlet, 4, an anode gas outlet, 5, a cathode gas inlet, 6, a cathode gas outlet, 7, aluminum end blocks, 8, tied together with tie rods (not shown), a gasket for sealing, 9, an electrically insulating layer, 10, and graphite current collector blocks with flow fields for gas distribution, 11, and gold plated current collectors, 12.

Figure 3:
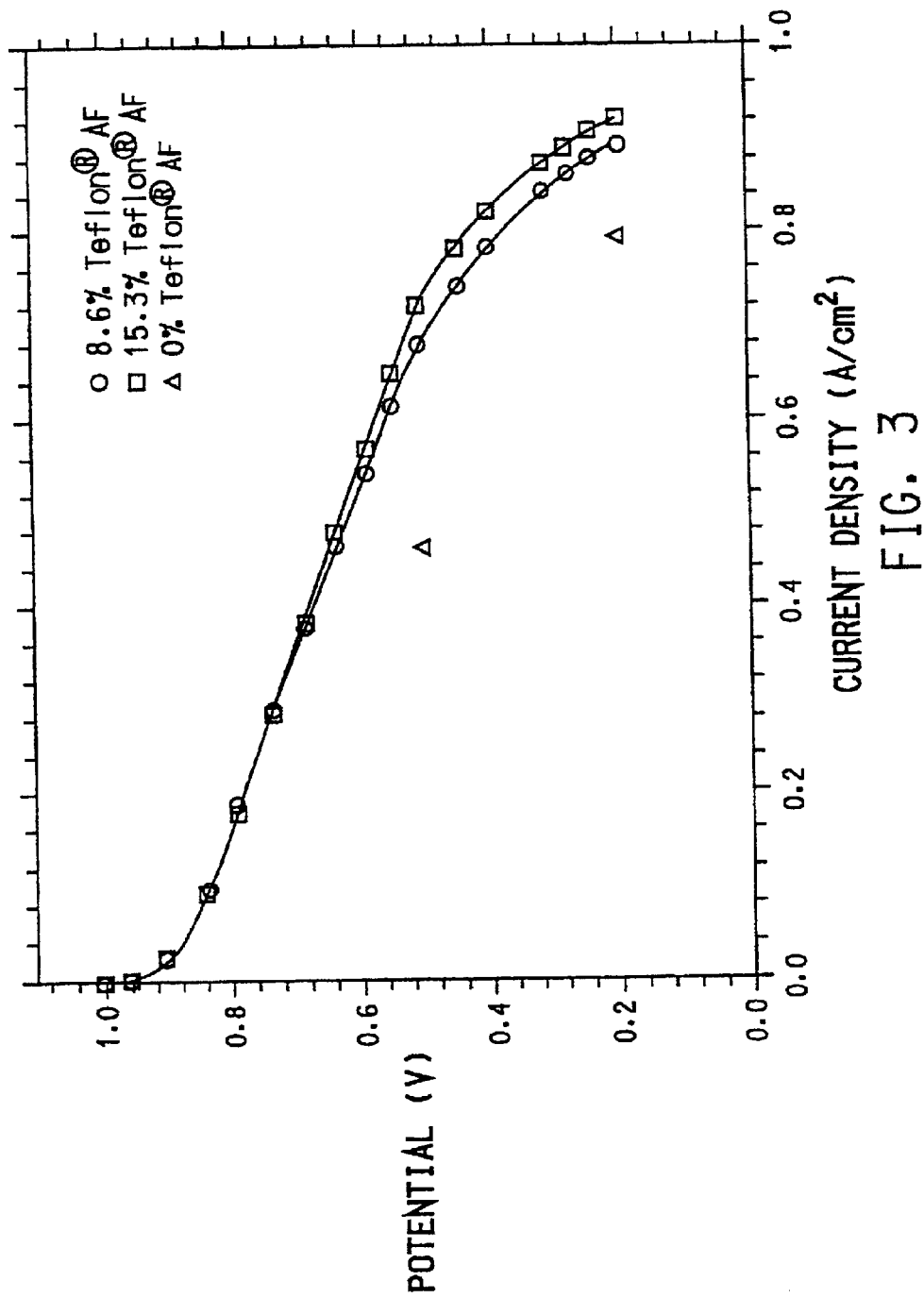
FIG. 3 graphically depicts the voltage vs. current density profile determined at 70° C. from the single cell test assembly depicted in FIG. 2, wherein the MEA comprised the embodiments of Examples 1 and 2, vs. the control described in Comparative Example 1.
Figure 4:
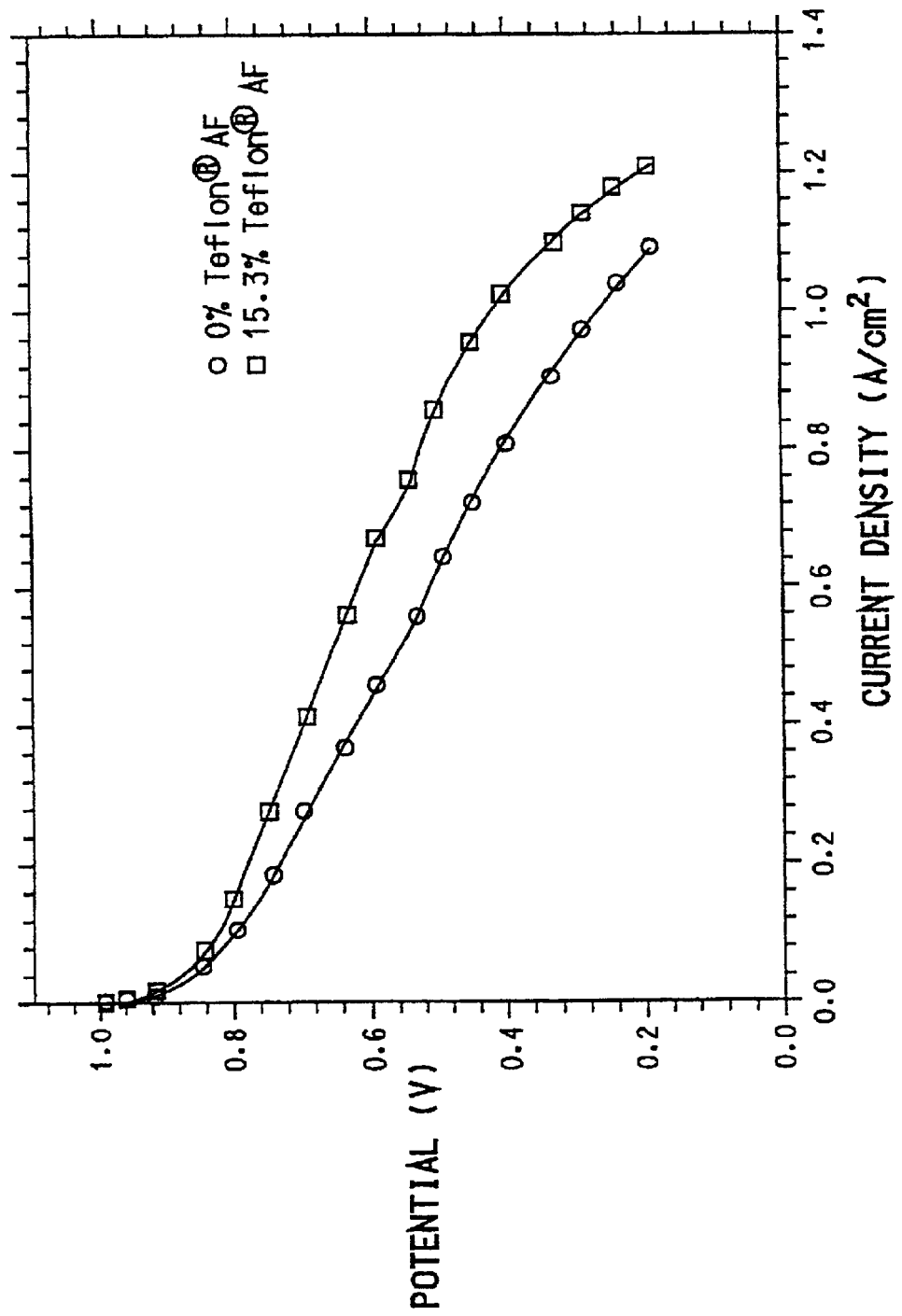
FIG. 4 graphically depicts the voltage vs. current density profile of the embodiment of Example 2, vs. the control described in Comparative Example 1 determined at 85° C. from the single cell test assembly depicted in FIG. 2.
Figure 5:
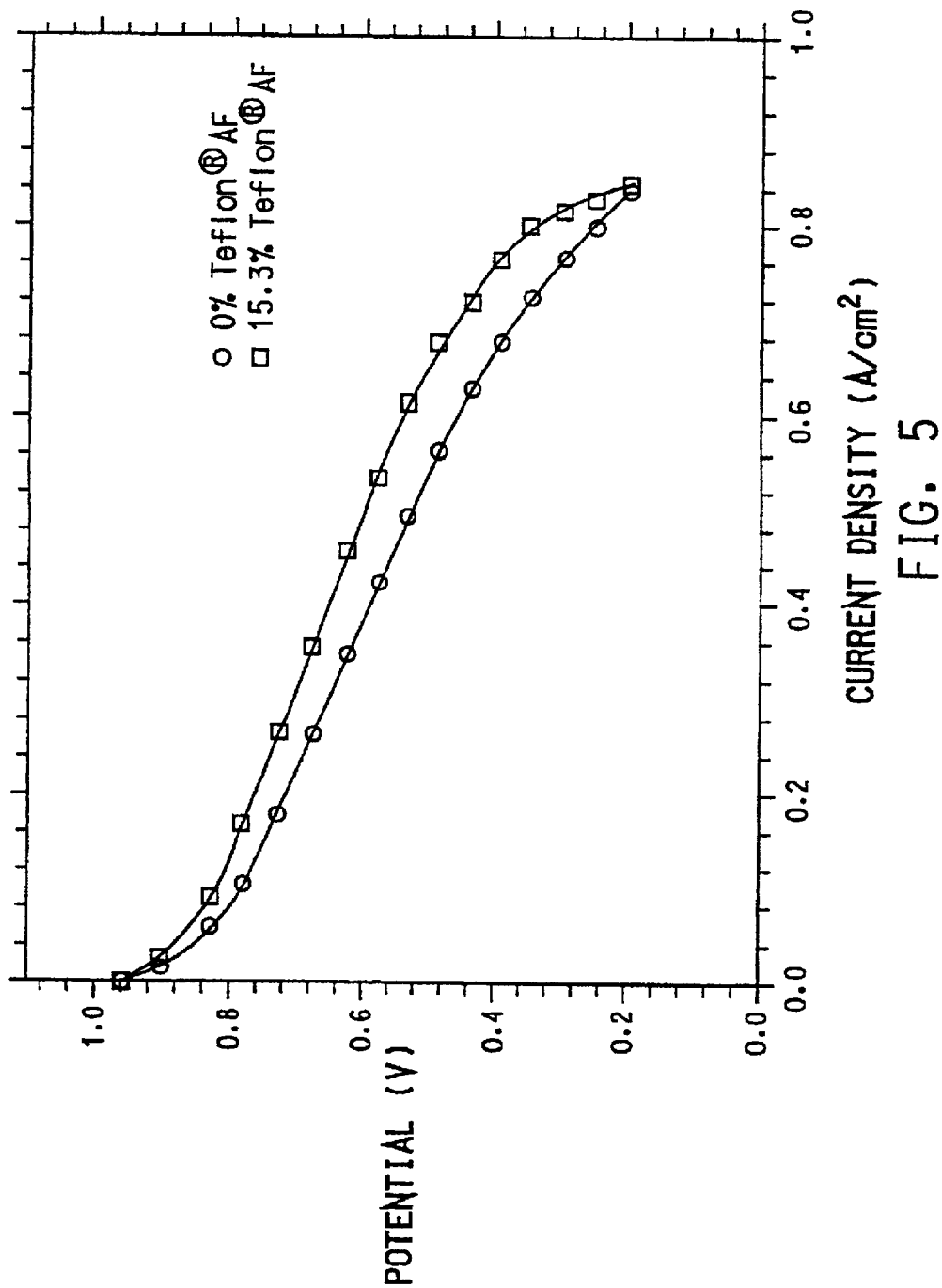
FIG. 5 graphically depicts the voltage vs. current density profile of the embodiment of Example 2 and the control of Comparative Example 1 determined at 50° C. from the single cell test assembly depicted in FIG. 2.

Fuel cell performance was determined under the following conditions: Hydrogen (500 cc/min) and oxygen (1000 cc/min) gases at 30 psi were passed into the anode and cathode side of the fuel cell respectively. These gases were purged through the humidifiers just prior to entering the fuel cell in order to keep the membrane wet The current was observed by varying the potential of the cell at a given temperature. The current for the unit area is calculated from the total current obtained and the potential vs current density plots for the cell at various temperatures are shown in FIGS. 3–5.

Comparative Example 1

According to a method known in the art, a specimen of Toray TGPH-090 carbon paper was soaked for 6–8 minutes in Teflon® PTFE T-30 aqueous dispersion diluted with water in a 4:1 ratio of water to Teflon® The Teflon® soaked carbon paper was removed, dried, and sintered according to the cycle shown in FIG. 1. This sintered PTFE-coated carbon paper was further coated with a slurry formed by adding 80 parts of Vulcan® XC-72 carbon to 20 parts of Teflon® T-30 and mixing at high shear. The slurry coated paper was further sintered in a second heating cycle, shown in FIG. 1, to form a GDB of the art. The final loading of the dried carbon slurry was about 2 mg/cm$^2$. Applied to the GDB formed, was about al 0 ml portion of the catalyst paste, prepared as described herein above, using a screen printer (MPM Corp., Model TF-100).

The thus formed electrodes were first air dried for 30 mins and then oven dried at 90–1000° C. for 1 hr. The electrodes made by the above process were 25 cm$^2$ size. Two dried 25 cm$^2$ electrodes were taken and painted, each with 150 mg of 5 wt % Nafion® solution (SE5112, DuPont Company). They were air dried for 20–30 mins and oven dried at 90° C. for another 60 mins. The dried coated electrodes were positioned on either side of a wet Nafion® N115 perfluorosulfonic acid membrane (DuPont Company, Wilmington, Del.) to form an unconsolidated MEA.

The unconsolidated MEA was placed between two layers of Kapton® polyimide film (DuPont Company) and that assembly between two layers of silicone rubber sheeting, and finally between two flat steel plates. The whole assembly was placed into a hydraulic press preheated to 135° C., and allowed to heat for 3 minutes at just contact pressure followed by application of 3000 lbs of ram force for 2 minutes. The press was cooled to room temperature while the MEA assembly was held under pressure, and then the MEA was removed and stored in water to maintain the wet condition until used.

The MBA was placed in the single cell assembly and the cell hardware was tightened to 1.5 ft-lbs torque using a wrench. This cell assembly was connected to the Test Station GT120 (GlobeTech Inc, Texas) and polarization data (current-potential curve) was generated at 70° C. Reference is now made to FIG. 3, which shows the graphical result for the points corresponding to 0% Teflon® AF, the current density at 0.2 volt was about 0.8 A/cm2.

Example 1

1.6 g of a 6 wt % solution of Teflon® AF 1601 (DuPont Company) was added to a portion of the catalyst paste prepared as hereinabove described containing 0.85 g of Pt/C and 0.1703 g of Nafion®. The resulting mixture was stirred for 2 hrs to form a catalyst composition containing 8.6 wt-% Teflon® AF.

Electrodes and an MEA were formed in the same manner as described in Comparative Example 1. The MEA, so formed, was tested at 70° C. as in Comparative Example 1. Reference is again made to FIG. 3 which shows the graphical result for the points labeled 8.6 wt-% Teflon® AF. The current density of 0.89 A/cm2 at 0.2 volt was significantly higher than in Comparative Example 1.

Example 2

0.096 g (1.6 g of 6 wt % solution) of Teflon® AF 1601 was added to another portion of the catalyst paste prepared as hereinabove described containing 0.43 g of Pt/C and 0.086 g of Nafion®. The resulting mixture was stirred for 2 hrs to form a catalyst composition containing 15.3% by weight of Teflon® AF.

Electrodes and an MEA were formed in the same manner as described in Comparative Example 1. The MEA, so formed, was tested at 70° C. as in Comparative Example 1. In FIG. 3, the graphical result for these points are labeled 15.3% Teflon® AF. The current density of about 0.92 A/cm$^2$ was significantly higher than that in Comparative Example 1.

Comparative Example 2

The MEA of Comparative Example 1 was tested at 85° C. in this comparative example. Reference is now made to FIG. 4, which shows the graphical result for the points labeled 0% Teflon® AF. The current density at 0.2 volt was about 1.091 A/cm$^2$.

Example 3

The MEA of Example 2 was tested in this example at 85° C. Reference again is made to FIG. 4, which shows the graphical result for the points labeled 15.3% Teflon® AF. The current density of about 1.22 A/cm2 at 0.2 volt was higher than that in Comparative Example 2.

Comparative Example 3

The MEA of Comparative Example 1 was tested at 50° C. in this comparative example. Results are shown in FIG. 5 for the points labeled 0% Teflon® AF.

Example 4

The MEA of Example 2 was tested at 50° C. in this example. Reference is now made to FIG. 5, which shows the graphical result for the points labeled 15.3% Teflon®) AF. The current at 0.2 volt was in the same as in Comparative Example 3. However, at higher voltages there was a clear increase in current associated with the MEA of Example 2.

Comparative Example 4 and Examples 5 to 7

Comparative Example 4 and Examples 5 to 7 describe the effects of adding an amorphous fluoropolymer to the GDB composition, the catalyst layer containing no fluoropolymer except a Nafion® binder was applied to the SPE membrane as herein described.

A 3.5% solids solution of unhydrolyzed 940EW Nafion® perflouro ionomer resin (DuPont Company, Wilmington, Del.) was formed by combining 586 g of the Nafion® with 16,455 g of Fluorinerte FC-40 perfluorinated solvent (3M Company, Minneapolis, Minn.) in a 12 L round bottom flask equipped with a stirrer and a water-cooled reflux condenser. The mixture was stirred at 500 rpm for 16 hours at room temperature followed by refluxing at 145° . for 4 hours. The resulting solution was cooled and filtered into a 5 gallon plastic pail. A 5 gram sample was dried to determine solids content.

85 g of the Nafion® solution was combined with 15 grams of a 40% platinum supported on carbon (Etek Inc., Natick, Mass.) to form a catalyst paste. The carbon was Vulcan® XC-72 carbon black powder (Cabot Corp. Billerica, Mass.). The mixture was milled for 2 hours, at room temperature, in an Eiger Mini® 100 bead mill (Eiger Machinery Co., Mondelein, Ill.) containing 1.0–1.25 mm zirconia beads. Following milling, the particle size was determined to be less than I micrometer using a fineness of grind gauge, Model 5252 (Precision Gauge and tool Company, Dayton, Ohio) and the % solids was in the range 13.56–13.8.

A 10.2 cm×10.2 cm piece of 76 μm thick Kapton® polyimide film (DuPont Company, Wilmington Del.), after recording its weight, was placed on a flat vacuum board. Another piece of 76 μm thick Kapton® film with a 7.1 cm×7.1 cm window cut out of it was placed on top of the first piece making sure that the open window in the second piece of film was centered on the first piece. The second piece was slightly bigger than the first to have at least part of it in direct contact with the vacuum board. Using a disposable pipette, a small amount (~10 cc) of the catalyst paste was put on the second Kapton® film just above the open window. With a doctor blade the paste was drawn down so as to fill the area of the open window. The top film was then carefully removed and the coating deposited on the first film was allowed to air dry for several hours until all of the solvent had completely evaporated to form a catalyst coated decal. A wet coating thickness of about 76 μm typically resulted in a catalyst loading of 0.3 mgPt/cm$^2$ in the final CCM.

A 10.2 cm×10.2 cm piece of wet, acid-exchanged Nafion® N112 perfluoro ionomer membrane (DuPont Company, Wilmington Del.) was sandwiched between two catalyst coated decals formed as hereinabove described. Care was taken to ensure that the coatings on the two decals were registered with each other and were positioned facing the membrane. The assembly so formed was introduced between the 20.3 cm×20.3 cm platens of a hydraulic press preheated to 145° C. The press was closed and brought to a ram force of 22000 N. The sandwich assembly was kept under pressure for ~2 mins and then cooled for ~2 mins still under pressure. The assembly was removed from the press and the Kapton® pieces were slowly peeled off revealing that all the catalyst coating had transferred to the membrane. The CCM thus formed was immersed in a tray of room temperature water (to ensure that the membrane was completely wet) and carefully transferred to a zipper bag for storage and future use.

Prior to forming an MEA therewith, in order to hydrolyze the Nafion® in the catalyst layer, the CCMs formed as hereinabove were placed between two layers of PTFE lab matting (obtained from Cole-Parmer Instrument Company, Vernon Hills, Ill. 60061, Catalog No. E-09406-00) and immersed in a 30 wt % NaOH solution at 80° C. for 30 min. The solution was stirred to assure uniform hydrolyses. After 30 minutes in the bath, the CCM's were removed and rinsed completely with fresh deionized water to remove all the NaOH.

The thus hydrolyzed CCMs, still in Teflon® mesh, were then immersed in a 15 wt % nitric acid solution at a temperature of 65° C. for 45 minutes. The solution was stirred to assure uniform acid exchange. This procedure was repeated in a second bath containing 15 wt % Nitric acid solution at 65° C. and for 45 minutes. The CCMs were then rinsed in flowing deionized water for 15 minutes at room temperature to ensure removal of all the residual acid. They were then packaged wet until ready for use.

Comparative Example 4

31 ml of Teflon® Type 30, a 60% solids PTFE dispersion (DuPont Company, Wilmington Del.) was diluted in 469 ml of deionized water, in a glass tray. A 7.5 cm×7.5 cm piece of Type TGP090 carbon paper (Toray Corporation, Japan) was immersed into the dispersion for 1 minute and air dried for 2 hours. The dried film was placed into an oven (Fisher Scientific, Programmable furnace, Model 497) and sintered in a nitrogen atmosphere according to the sintering cycle shown in FIG. 1 to form a PTFE-coated GDB. Two pieces of carbon paper were thus treated, using separate aliquots of diluted PTFE dispersion. The PTFE concentration was found to be in the range of 8.6–9.5%. One side of each PTFE-treated GDB was roughened by rubbing with 600 grit sandpaper, and a single cell assembly was constructed for testing, wherein the SPE membrane, 1, and catalyst layer, 2, form the CCM as herein above described (see FIG. 2). The CCM was placed between the roughened surfaces of the PTFE-coated GDBs, 3, prepared as hereinabove described, to form the MEA. The CCM and the GDB pieces were assembled together without heat consolidation. The single cell assembly was connected to a fuel cell test assembly obtained from the GM/DOE Fuel Cell Development Center at Los Alamos National Laboratory.

Figure 6:
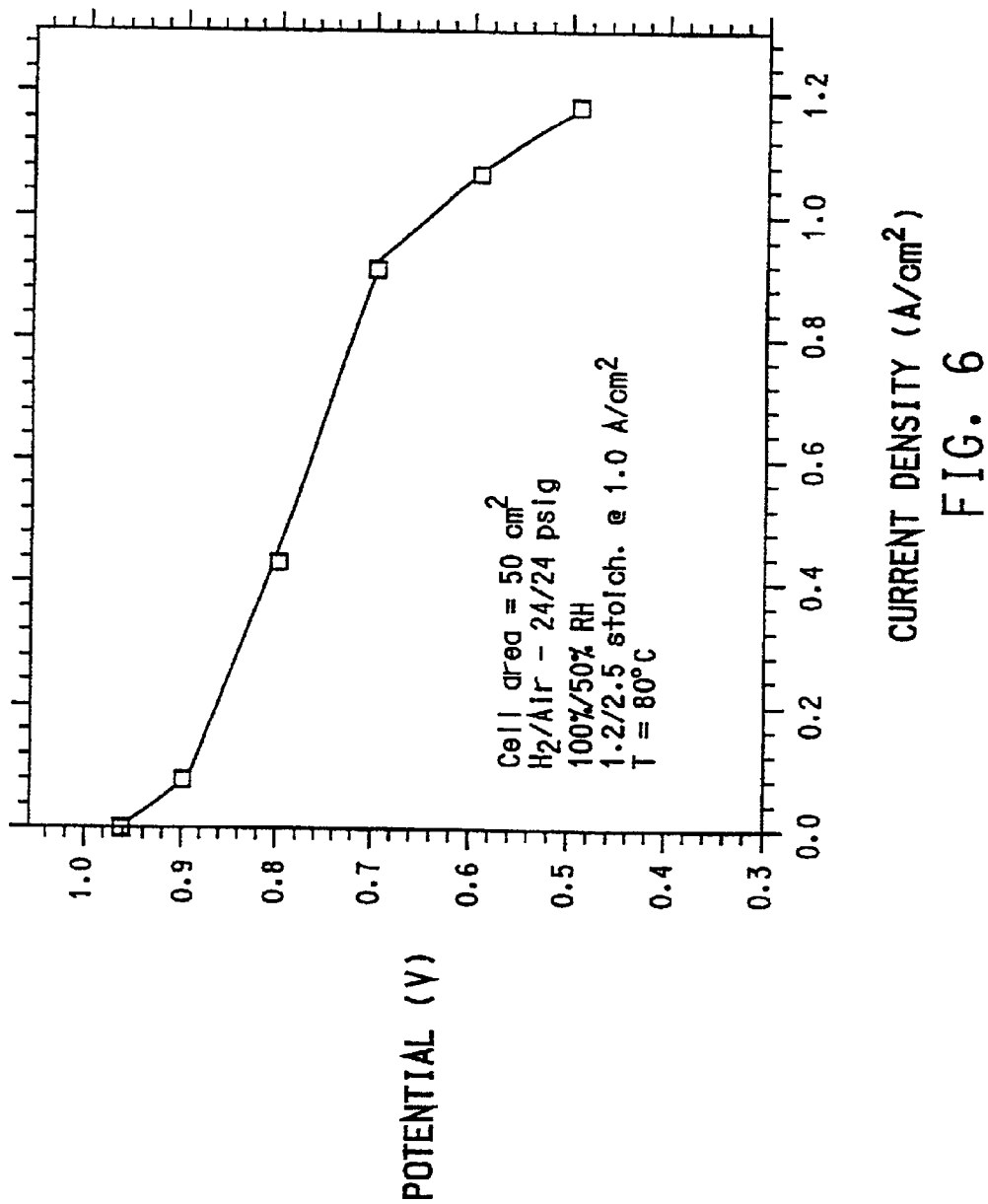
FIG. 6 graphically depicts the voltage vs. current density profile determined for a fuel cell incorporating a GDB coated with about 9% of a Teflon® PTFE.

Reference is now made to FIG. 6, which shows the voltage-current density profile. This figure shows a performance curve for a cell using gas diffusion backing treated with Teflon® PTFE dispersion. The current density at 0.5 volt was about 1.2 A/cm².

Examples 5–7

The method for forming a PTFE-coated GDB of Comparative Example 4 was followed except that the PTFE was replaced by an amorphous terpolymer and the sintering cycle of FIG. 1 was replaced by oven heating to 140° C. under vacuum and holding at that temperature for 1 hour. The amorphous terpolymer, comprising 60 mol-% TFE, 26 mol-% perfluoromethyl vinyl ether, and 14 mol-% perfluoroethylvinyl ether produced according to the teachings of Anolick et al, U.S. Pat. No. 5,663,255, was dissolved in PF5080 perfluorooctane available from 3M Company, Minneapolis, Minn., at the concentrations shown in Table 1, and the carbon paper was soaked 30 seconds with the resultant loading of amorphous fluoropolymer after drying shown as well.

TABLE 1

Experimental Details on GDB Treatment Using Experimental Soluble Fluoropolymers

| Example | Solution Concentration (wt % polymer) | Final Amorphous Fluoropolymer loading (%) |
| --- | --- | --- |
| 5 | 3% | 15.5 |
| 6 | 1.5% | 6.4 |
| 7 | 0.75% | 3.2 |

Figure 7:
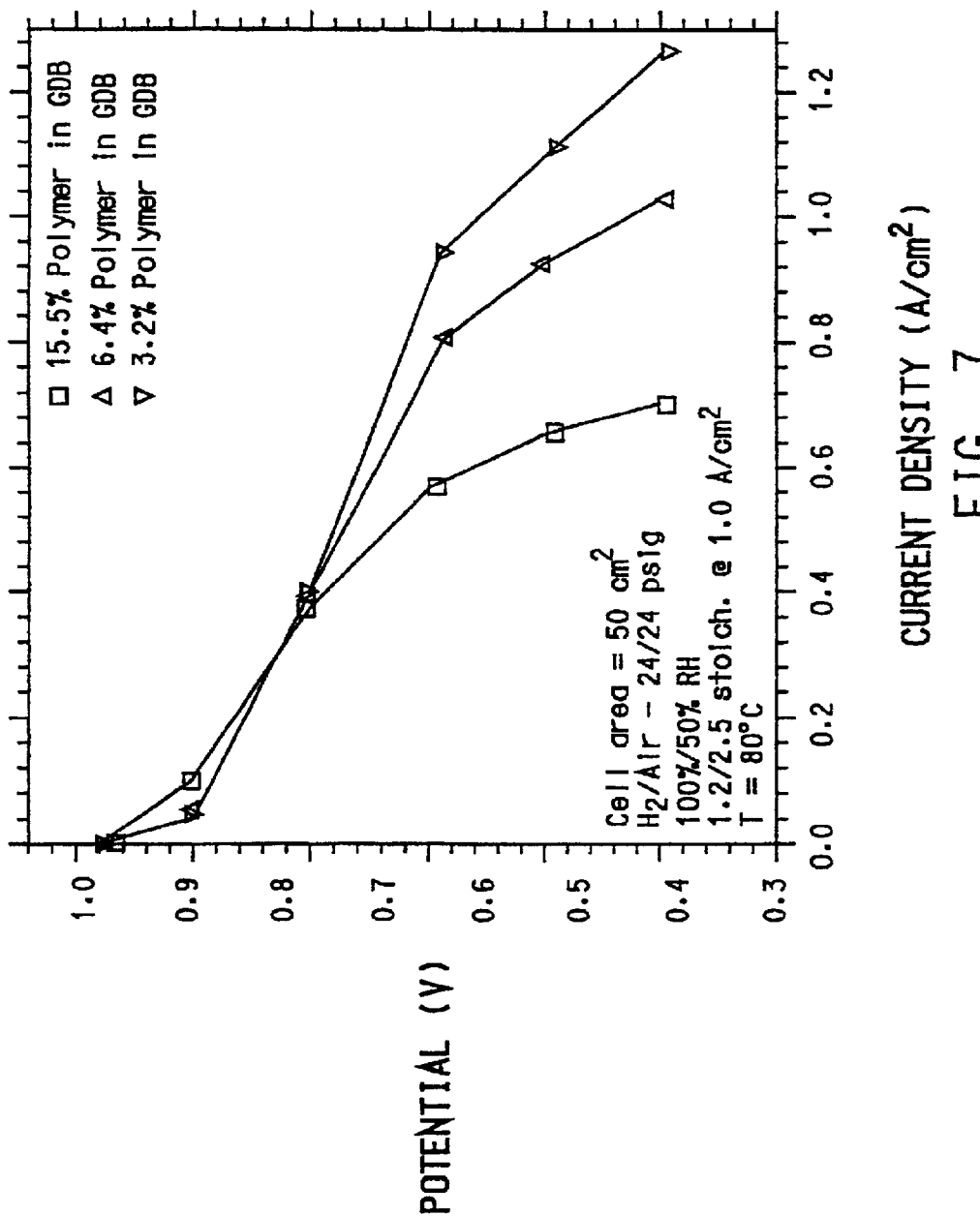
FIG. 7 graphically depicts the voltage vs. current density profile determined for fuel cells incorporating GDBs coated with Free different concentrations of an amorphous fluoropolymer.

Reference is now made to FIG. 7, which shows the fuel cell performance results. In FIG. 7, 1.2/2.5 stoichiometry @ 1 A/cm² refers to the flow rates of hydrogen and air during the fuel cell measurements. Hydrogen gas was introduced into the anode side of the fuel cell at a flow rate 12 times that required for the cell to operate at 1 A/cm² and air was introduced to the cathode side at a flow rate 2.5 times that required for the cell to operate at 1 A/cm². These flow rates in the current cell corresponded to 417 cc hydrogen per minute and 2072 cc air per minute. The gases were humidified to 100% RH and 50% RH, respectively, by adding 0.08 cc/min and 0.176 ml/min of water to the hydrogen and air streams respectively.

In FIGS. 6 and 7, similar conditions were applied thus indicating that similar fuel cell performance can be obtained using the new fluoropolymers at a much lower loading than that of the conventionally used PTFE. This is true at the lowest loading of the new fluoropolymer (~3.2 wt %) as seen in FIG. 7.

It is claimed:

1. A method for forming a membrane electrode assembly comprising:
   forming a layered structure including at least one substantially fluorinated solid polymer electrolyte membrane, at least one catalyst layer containing a catalyst and a substantially fluorinated ionomeric resin binder, and at least one fibrous carbon gas diffusion backing layer, wherein at least one of said layers further comprises an amorphous fluoropolymer;
   heating the layered structure to a temperature of less than about 200° C.; and
   applying pressure to the heated layered structure to produce a consolidated membrane electrode assembly wherein the catalyst layer is in ionically conductive contact with the solid polymer electrolyte membrane, and the gas diffusion backing layer is in electronically conductive contact with the catalyst layer.

2. The method of claim 1 wherein both the catalyst layer and the gas diffusion backing layer further comprise an amorphous fluoropolymer.

3. The method of claim 1 wherein the solid polymer electrolyte membrane comprises an ionomer comprising monomer units of tetrafluoroethylene and 2–20 mol-% of monomer units described by the formula —(O—CF$_2$CFR)$_a$O—CF$_2$(CFR')$_b$SO$_3$—H+

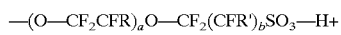

where R and R' are independently selected from F, Cl or a perfluorinated alkyl group having 1 to 10 carbon atoms, a=0, 1 or 2, b=0 to 6.

4. The method of claim 3 wherein a=1, R is trifluoromethyl, R' is F, b=1, and the equivalent weight of the SPE membrane is in the range of 700–2000.

5. The method of claim 1 wherein the amorphous fluoropolymer is present in the gas diffusion backing layer at a concentration of less than 15% by weight.

6. A method for forming a catalyst coated membrane comprising:
   combining a substantially fluorinated non-ionic polymeric ionomer-precursor resin and a catalyst to form a homogeneous mixture;
   applying the mixture to the surface of a solid polymer electrolyte membrane to form a coated membrane;
   contacting the coated membrane with an alkali metal base to hydrolyze the non-ionic polymeric ionomer-precursor resin forming an ionomer therefrom; and
   contacting the ionomer with a mineral acid.

7. The method of claim 6 wherein the homogeneous mixture further comprises an amorphous fluoropolymer.

8. The method of claim 1 or claim 7 wherein the amorphous fluoropolymer is a copolymer comprising monomer units derived from tetrafluoroethylene (TFE) and at least 20 mol-% of monomer units derived from monomers selected from the group consisting of hexafluoropropylene (HFP), perfluoroalkyl vinyl ethers, 2,2-bistrifluoromethyl-4,5-difluoro-1,3-dioxole (PDD), and mixtures thereof.

9. The method of claim 8 wherein the amorphous fluoropolymer is a terpolymer comprising about 60 mol-% of monomer units derived from TFE, about 26 mol-% of monomer units derived from perfluoromethyl vinyl ether, and about 14 mol-% of monomer units derived from perfluoroethylvinyl ether, or a copolymer of TEE and PDD comprising 67 mol-% PDD.

10. A membrane electrode assembly comprising:
   a substantially flourinated solid polymer electrolyte membrane separator;
   a catalyst layer in ionic conductive contact with said separator wherein the catalyst layer comprises a catalyst and a substantially fluorinated ionomeric resin binder;
   a fibrous carbon gas diffusion backing layer in electronic conductive contact with said catalyst layer; and
   a fluoropolymer included in at least one of said layers, the fluoropolymer comprising an amorphous fluoropolymer.

11. The membrane electrode assembly of claim 10 wherein the solid polymer electrolyte membrane comprises an ionomer comprising monomer units of tetrafluoroethylene and 2–20 mol-% of monomer units described by the formula

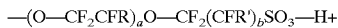
—(O—CF$_2$CFR)$_a$O—CF$_2$(CFR')$_b$SO$_3$—H+ where R and R' are independently selected from F, Cl or a perfluorinated alkyl group having 1 to 10 carbon atoms, a=0, 1 or 2, b=0 to 6.

12. The membrane electrode assembly of claim 11 wherein a=1, R is trifluoromethyl, R' is F, b=1, and the equivalent weight of the SPE membrane is in the range of 700–2000.

13. The membrane electrode assembly of claim 10 wherein the amorphous fluoropolymer is a copolymer comprising monomer units derived from TFE and at least 20 mol-% of monomer units derived from monomers selected from the group consisting of hexafluoropropylene (HFP), perfluoroalkyl vinyl ethers, 2,2-bistrifluoromethyl-4,5-difluoro 1,3-dioxole (PDD), and mixtures thereof.

14. The membrane electrode assembly of claim 13 wherein the amorphous fluoropolymer is a terpolymer comprising about 60 mol-% of monomer units derived from TFE, about 26 mol-% of monomer units derived from perfluoromethyl vinyl ether, and about 14 mol-% of monomer units derived from perfluoroethylvinyl ether; or a copolymer of TFE and PDD comprising 67 mol-% PDD.

15. The membrane electrode assembly of claim 10 wherein the amorphous fluoropolymer is present in the gas diffusion backing layer at a concentration of less than 15% by weight.

* * * * *